United States Patent
Sikora et al.

(10) Patent No.: US 9,291,451 B2
(45) Date of Patent: Mar. 22, 2016

(54) METHOD AND DEVICE FOR MEASURING THE CENTRICITY OF A CONDUCTOR IN AN INSULATING CASING

(71) Applicant: SIKORA AG, Bremen (DE)

(72) Inventors: Harald Sikora, Bremen (DE); Klaus Bremer, Grasberg (DE)

(73) Assignee: SIKORA AG, Bremen (DE)

( * ) Notice: Subject to any disclaimer, the term of this patent is extended or adjusted under 35 U.S.C. 154(b) by 93 days.

(21) Appl. No.: 14/444,349

(22) Filed: Jul. 28, 2014

(65) Prior Publication Data

US 2015/0029493 A1     Jan. 29, 2015

(30) Foreign Application Priority Data

Jul. 29, 2013 (DE) .................. 10 2013 012 443

(51) Int. Cl.
| | |
|---|---|
| G01N 21/00 | (2006.01) |
| G01B 11/24 | (2006.01) |
| G01B 7/28 | (2006.01) |
| G01B 7/312 | (2006.01) |
| G01B 11/00 | (2006.01) |

(52) U.S. Cl.
CPC ........ G01B 11/24 (2013.01); G01B 7/28 (2013.01); G01B 7/312 (2013.01); G01B 11/002 (2013.01)

(58) Field of Classification Search
CPC ...... G01B 11/24; G01B 7/28; H01J 37/32935; G01J 3/02; G01N 21/64; G01N 21/68; G01N 21/55; G01N 2015/1037
USPC ........................................ 356/72–73
See application file for complete search history.

(56) References Cited

U.S. PATENT DOCUMENTS

| | | | |
|---|---|---|---|
| 4,086,044 A | 4/1978 | Sikora | |
| 5,528,141 A | 6/1996 | Kyriakis | |
| 2002/0044289 A1 | 4/2002 | Blohm et al. | |
| 2003/0117633 A1* | 6/2003 | Rudolph | G01B 11/24 356/521 |
| 2005/0168724 A1 | 8/2005 | Studer | |
| 2008/0282565 A1 | 11/2008 | Livingston | |

FOREIGN PATENT DOCUMENTS

| | | |
|---|---|---|
| DE | 2517709 C3 | 11/1976 |
| EP | 0924493 A1 | 6/1999 |
| EP | 1495284 B1 | 1/2005 |

* cited by examiner

*Primary Examiner* — Abdullahi Nur
(74) *Attorney, Agent, or Firm* — Vidas, Arrett & Steinkraus, P.A.

(57) ABSTRACT

A method for measuring the centricity of a conductor in an insulating casing, in which the string formed by the conductor with its insulating casing is moved along a conveying direction. A device for measuring the centricity of a conductor in an insulating casing includes an inductive measuring apparatus, first and second optical measuring apparatus and an evaluation apparatus.

16 Claims, 6 Drawing Sheets

METHOD AND DEVICE FOR MEASURING THE CENTRICITY OF A CONDUCTOR IN AN INSULATING CASING

BACKGROUND OF THE INVENTION

The invention relates to a method for measuring the centricity of a conductor in an insulating casing, in which the string formed by the conductor with its insulating casing is moved along a conveying direction. Moreover, the invention relates to a corresponding device.

Measurement methods are known in which the position of the conductor is measured with an inductive measuring apparatus and the position of the insulating casing surrounding the conductor with an optical measuring apparatus in a common measuring plane. Based on both measurements, the centricity of the conductor in the insulating casing is determined This type of embodiment is problematic in that the measuring apparatuses can get in each other ways due to their arrangement in the same measuring plane. This circumstance is amplified when, as is often required, two optical measuring apparatuses are used.

The so-called WANDEXE eccentricity measuring apparatus of the applicant with two optical diameter testing devices, which are arranged offset with respect to each other in a measuring head by 90°, and an inductive measuring circuit arranged in the same measuring plane as the optical diameter measuring apparatuses is known from DE 25 177 09 C3. A contact-free system and method for measuring the centricity and the diameter of a string are known from EP 1 495 284 B1. The position of the string is thereby measured in an optical measuring plane by means of an optical measuring apparatus. In a first inductive measuring plane, which lies in the conveying direction of the string in front of the optical measuring plane, the position of the conductor is measured by means of an inductive measuring apparatus. In a second inductive measuring plane, which lies in the conveying direction of the string behind the optical measuring plane, the position of the conductor is also measured with a second inductive measuring apparatus. The inductively measured positions of the conductor are correlated such that one position of the conductor in the optical measuring plane results. Among other things, the centricity of the conductor in the insulating casing is determined from this determined position of the conductor and the measured position of the line in the optical measuring plane.

In the case of the known systems and methods, measurement errors result in the case of a curvature in the string, frequently caused by the sagging of a conductor. In the case of such a curvature, the position of the conductor derived from the inductive measurements in the optical measuring plane does not match the actual position of the conductor in the optical measuring plane. If the string has its maximum curvature in the area of the optical measuring plane, the inductive measuring apparatuses measure the same positions of the conductor. However, due to the curvature of the string, these do not correspond with the position of the conductor in the optical measuring plane. Such errors also result when the curvature of the string has its maximum not in the area of the optical measuring plane, but offset with respect to it in the conveying direction. In this case, different positions of the conductor are determined through the inductive measuring apparatuses. However, also in this case, a derived position of the conductor in the optical measuring plane does not correspond with the actual position of the conductor due to the (asymmetrical) curvature. The determined centricity is also faulty due to the erroneously determined positions of the conductor in the optical measuring plane.

The measurement error depends on the curvature radius of the string. For example, a curvature radius of for example 10 m can occur at a distance of 2 m between the support rollers carrying the string. Measurement errors are hereby causes in the area of 20 µm. An equalization of the string curvature through a larger number of support rollers is not possible in practice. Rather, a finally wave-like progression of the string and thus an undefined measurement situation, which leads to an incalculable error, then results. The curvature of the string can also not be avoided by arbitrarily increasing the tractive force exerted on the string. Thus, the string and in particular its conductor already reach the yield point before a complete elimination of the curvature through stretching.

Based on the explained state of the art, the object of the invention is to provide a method and a device of the initially named type, with which the centricity of the conductor in the insulating casing can be reliably determined even in the case of a curvature of the string.

BRIEF SUMMARY OF THE INVENTION

The invention solves the object on one hand through a method for measuring the centricity of a conductor in an insulating casing, in which the string formed by the conductor with its insulating casing is moved along a conveying direction, comprising the steps:

in an inductive measuring plane, the position of the conductor is determined by means of an inductive measuring apparatus, in a first optical measuring plane, which lies in the conveying direction of the string in front of the inductive measuring plane, the position of the string is determined by means of at least one first optical measuring apparatus, in a second optical measuring plane, which lies in the conveying direction of the string behind the inductive measuring plane, the position of the string is determined by means of at least a second optical measuring apparatus, the positions of the string determined in the first and second optical measuring plane are correlated such that a position of the string results in the inductive measuring plane and the centricity of the conductor in the insulating casing is determined from this resulting position of the string in the inductive measuring plane and from the position of the conductor determined in the inductive measuring plane, wherein a spatial resolution optical measurement takes place in the first optical measuring plane and/or in the second optical measuring plane such that a sloping position and/or a curvature of the string with respect to the conveying direction, in particular in the first optical measuring plane and/or in the second optical measuring plane, is identified, wherein such a sloping position and/or curvature is taken into consideration during the determination of the centricity of the conductor in the insulating casing.

The invention solves the object on the other hand through a device for measuring the centricity of a conductor in an insulating casing, in which the string formed by the conductor with its insulating casing is moved along a conveying direction, comprising:

an inductive measuring apparatus arranged in an inductive measuring plane for determining the position of the conductor in the inductive measuring plane, at least one first optical measuring apparatus arranged in a first optical measuring plane, which lies in the conveying direction of the string in front of the inductive measuring plane, for determining the position of the string in the first optical measuring plane, at least one second optical measuring apparatus arranged in a second optical measuring plane, which lies in the conveying direction of the string behind the inductive measuring plane, for determining the position of the string in the second optical measuring plane, an evaluation apparatus, which is designed to correlate the positions of the string determined in the first and second optical measuring plane such that a position of the string results in the inductive measuring plane and to determine the centricity of the conductor in the insulating casing from this resulting position of the string in the inductive measuring plane and from the position of the conductor determined in the inductive measuring plane, wherein the at least one first optical measuring apparatus and/or the at least one second optical measuring apparatus are designed to perform a spatial resolution optical measurement in the first optical measuring plane and/or in the second optical measuring plane such that a sloping position and/or a curvature of the string with respect to the conveying direction, in particular in the first optical measuring plane and/or in the second optical measuring plane, is identified and wherein the evaluation apparatus is further designed to take such a sloping position and/or curvature into consideration during the determination of the centricity of the conductor in the insulating casing.

The electrical conductor is surrounded in the known manner by an insulating casing, which was applied for example in an extrusion process. The conductor with its insulating casing forms a string, which is moved along a conveying direction. The conveying of the string thereby generally takes place along a straight conveying direction. As initially explained, unavoidable deviations in the string movement from the straight conveying direction, in particular a curvature in the string, result in practice. This can be both a sagging as well as an upwards curving curvature of the string.

In order to be able to reliably determine the centricity of the conductor in the insulating casing in spite of this, a reversal with respect to the measurement principle explained above from the state of the art takes place on one hand according to the invention. Thus, according to the invention, an optical measurement of the position of the string in front of and behind an inductive measuring plane is respectively performed and a position of the string in the inductive measuring plane is determined from it. The centricity is determined from this position of the string and from the position of the conductor inductively measured in the inductive measuring plane. The determination of the centricity can generally take place as generally known from the state of the art. In particular, the inductively measured position of the conductor in the inductive measuring plane can be correlated for this in the manner known from the state of the art with the determined position of the string in the inductive measuring plane. The inductive sensors can be in particular passive inductive sensors. A high-frequency alternating voltage in the conductor can thereby be generated, for example induced, which generates a high-frequency alternating current in the conductor. The magnetic alternating fields generated by the high-frequency alternating current are then measured by the passive inductive sensors.

Through the reversal of the measurement principle with respect to the explained state of the art, the principle according to the invention to perform a spatial resolution optical measurement in at least one of the optical measuring planes, preferably in both optical measuring planes is made possible, so that a potential sloping position or curvature of the string in particular in the first and/or second optical measuring plane is identified. A spatial resolution optical measurement can thus take place in order to increase the accuracy in particular in the first optical measuring plane and in the second optical measuring plane, respectively, such that a sloping position and/or a curvature of the string with respect to the conveying direction, in particular in the first optical measuring plane and in the second measuring plane, is identified. At least one of the optical measuring apparatuses, preferably both optical measuring apparatuses, measure in a spatial resolution manner on one hand perpendicular to the conveying direction and on the other hand in the conveying direction the position of the string, in particular the position of the edges of the insulating casing, that is two-dimensionally in a spatial resolution manner. A generally known shadow edge measurement can take place, in which the shadow borders of the insulating casing are represented on optical sensors. The determination of the edge positions can take place through a generally known diffraction seam analysis, such as is described for example in EP 0 924 493 B1. A sloping position or curvature of the string in the area of the first or second optical measuring plane can be determined from the edge positions of the insulating casing determined in a spatial resolution manner also in the conveying direction of the string. This can be taken into consideration during the determination of the centricity. Thus, it is possible to compensate for the measurement errors due to a curvature of the string during the evaluation.

A corrected position of the string in the inductive measuring plane can be created based on a sloping position and/or curvature of the string with respect to the conveying direction identified in particular in the first optical measuring plane and/or in the second optical measuring plane, based on which the centricity of the conductor in the insulating casing is determined This embodiment is thus based on a position of the string in the inductive measuring plane corrected based on the identified sloping position and/or curvature. A measurement error brought about for example by a sagging and a curvature created with it is compensated.

According to the invention, an attempt is not made to prevent a curvature of the string through additional measures since, as initially explained, this does not succeed fully anyway and creates an undefined measurement situation. Rather the curvature of the string is accepted, but identified metrologically and taken into consideration in the subsequent evaluation. According to the invention, a clearly defined measurement situation exists and the centricity of the conductor in the insulating casing determined on this basis is always reliable.

According to a further embodiment, it can be provided that a curvature radius or curvature diameter of the string is determined from the optical measurement performed in the first optical measuring plane and/or in the second optical measuring plane, based on which the corrected position of the string in the inductive measuring plane is created. In the case of this embodiment, it is approximately assumed that a curvature of the string, for example due to a sagging, progresses along a circularity at least in the measuring section bordered by the optical measuring planes. The assumption of a circular progression leads to a clearly defined measurement situation and can be taken into consideration in the course of the evaluation in a quick and easy manner. Moreover, it was shown that the approximate assumption of a circular progression leads to reliable measurement results.

According to a further embodiment, it can be provided that the curvature radius or curvature diameter of the string is determined in that a circle is formed, for which identified curvatures of the string in the first optical measuring plane and/or in the second optical measuring plane form circular segments, wherein the radius or diameter of this circle is selected as the curvature radius or curvature diameter. A point of intersection of two radial lines for the measured curvatures in the first and second optical measuring plane serves as the center point of the circle. Such a circle can be determined geometrically from three points lying on the circle. Thus, it is generally sufficient for the determination of the circle if a two-dimensionally spatial resolution measurement takes place in one of the two optical measuring planes (for example with a two-line optical sensor), while only a one-dimensionally spatial resolution measurement takes place in the respective other optical measuring plane (for example with a single-line optical sensor). In order to improve the accuracy for the determination of the circle, it is however preferred if a two-dimensionally spatial resolution measurement takes place in both optical measuring planes (for example with respectively one two-line optical sensor).

Furthermore, it can be provided that the curvature radius or curvature diameter is determined for a sloping position of the string identified in the first optical measuring plane and/or in the second optical measuring plane, in that respectively one perpendicular line is created on the determined sloping positions of the string and the point of intersection of the perpendicular lines is selected as the center point of a circle, for which the identified sloping positions of the string respectively form tangents or chords, wherein the radius or diameter of this circle is selected as the curvature radius or curvature diameter.

The radial lines for potentially identified curvatures of the string in the first and second optical measurement plane or respectively the perpendicular lines on sloping positions of the string potentially identified in the first and second optical measuring plane intersect at a point. This point of intersection is taken as the center of a circle in the aforementioned embodiments, for which the measured curvatures of the string form circular segments or respectively the measured sloping positions of the string form tangents or chords. The tangents are thereby adjacent to the point of intersection of the perpendicular lines with the measured sloping positions of the string. If chords are formed, they progress between the measured end points of the sloping positions. The circle that comes closest to the progression of the string, in particular its curvature, at least in the measurement section bordered by the optical measuring planes, is thus determined mathematically. Based on the diameter or respectively radius of this circle, the position of the string mainly at any points between the optical measuring planes, i.e. in particular in the inductive measuring plane, can be determined mathematically. Based on this position of the string, the centricity of the conductor in the insulating casing can be determined reliably based on the results of the inductive measuring apparatus. The arithmetic operations explained above are generally known to a person skilled in the art.

The inductive measuring plane and/or the first optical measuring plane and/or the second optical measuring plane can lie perpendicular to the conveying direction of the string. A measurement in a direction perpendicular to the conveying direction of the string thus takes place. The present application discusses measuring planes. Please note that measurements are actually performed in measurement areas expanded in the conveying direction in particular due to the optical measurement spatial resolution also in the conveying direction. This also goes for the inductive measuring plane due to the spatial expansion of the inductive measuring apparatus. A plane centered in this measurement area as seen in the conveying direction can thereby be taken as the measuring plane.

The string can be supported along its conveying direction by several support elements, preferably several support rollers, wherein the support elements immediately preceding and immediately following the inductive measuring plane can be arranged mirror-symmetrically to the inductive measuring plane. The maximum curvature of the string is created in the area of the inductive measuring plane through such a symmetrical arrangement of the support elements with respect to the inductive measuring plane. The optical measuring apparatuses then measure sloping positions or respectively curvatures, which are mirror-symmetrical to the inductive measuring plane, in the optical measuring planes. The center of a circle determined for example in the manner explained above lies in the inductive measuring plane. This simplifies the evaluation. For example, if the maximum curvature of the string does not lie in the inductive measuring plane for constructive reasons, this can also be taken into consideration in the course of the evaluation. The optical measuring apparatuses then measure non-mirror-symmetrical positions of the string in both optical measuring planes. The center of a circle determined in the manner explained above lies as seen in the conveying direction in front of or behind the inductive measuring plane.

Furthermore, it can be provided that the at least one first optical measuring apparatus and/or the at least second optical measuring apparatus (respectively) comprise at least one optical radiation source and (respectively) at least one two-dimensionally spatial resolution optical sensor. The two-dimensionally spatial resolution optical sensors can be formed for example from (respectively) at least two adjacent optical sensor rows. The use of a two-dimensional sensor array with more than two sensor rows is also possible. Other types of image sensors can also be used. The important thing here is that a two-dimensional spatial resolution measurement and thus an identification of a sloping position and/or curvature of the string are possible in one or both optical measuring planes. According to the invention, respectively two or more than two, for example three or four, optical measuring apparatuses can be also provided in the first and second optical measuring plane, which are respectively offset with respect to each other by a certain angle, for example 90°, 60° or 45°. Then all optical measuring apparatuses of one or both optical measuring planes can measure in a two-dimensionally spatial resolution manner. More than one inductive measuring apparatus, for example two measuring apparatuses, which measure offset with respect to each other by an angle of, for example, 90°, can also be provided in the inductive measuring plane. The centricity of the conductor in the insulating casing can be measured in several directions around the string in this manner An ovality of the string can also be identified in the case of a sufficient number of optical measuring apparatuses. The selection of the optical measuring apparatus and in particular the optical sensors impacts the question whether the optical measuring apparatuses can differentiate between a sloping position and a curvature. This depends on the spatial resolution of the optical measurement in particular in the conveying direction of the string. If the optical measuring apparatuses each respectively comprise only one optical sensor formed from two adjacently arranged sensor rows aligned with their longitudinal extension perpendicular to the conveying direction, a sloping position will also be measured in the case of a curvature of the string, since there are respectively only two measurement fields in the conveying direction. This behaves differently in the case of a larger spatial resolution in the conveying direction, that is when the optical sensors comprise for example a two-dimensional sensor array of more than two adjacently arranged line sensors. A curvature of the string can then be measured.

Naturally, several optical radiation sources and several optical sensors can also be provided, for example respectively offset with respect to each other by 90°, in each of the optical measuring planes. Additional simplifications can thus be achieved during the evaluation, as is generally described in EP 0 924 493 B1. Moreover, as is generally known, the inductive measuring apparatus can comprise at least two inductive measuring coils, which are arranged in pairs with respect to each other in the inductive measuring plane.

BRIEF DESCRIPTION OF THE SEVERAL VIEWS OF THE DRAWINGS

One exemplary embodiment of the invention is explained below in greater detail using figures. They show schematically.

DETAILED DESCRIPTION OF THE INVENTION

Figure 1:
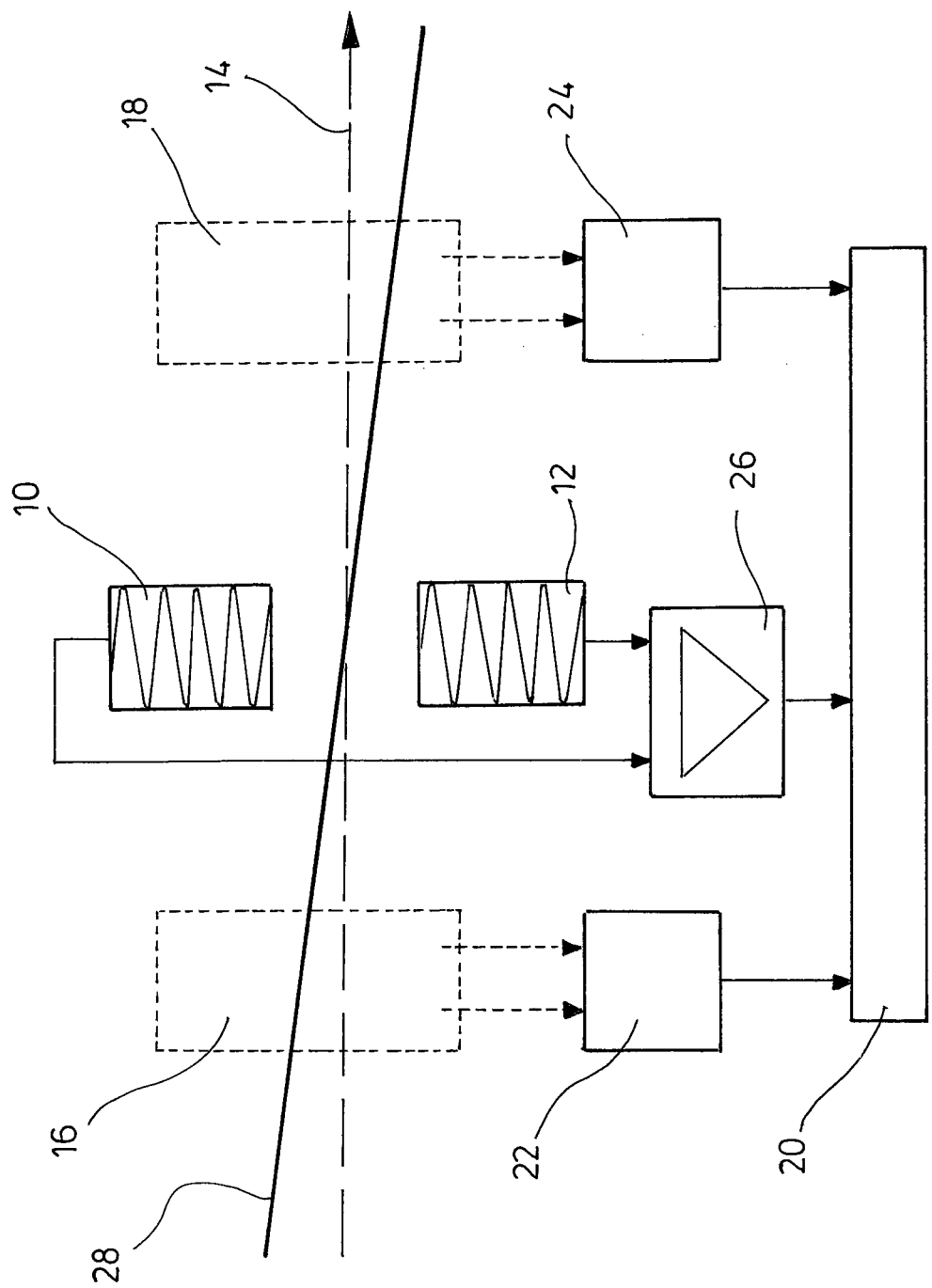
FIG. 1 a device according to the invention in a first measurement situation.

If not otherwise specified, the same reference numbers indicate the same objects in the figures. The device according to the invention shown in FIGS. 1 and 2 has an inductive measuring apparatus arranged in an inductive measuring plane, which comprises in the shown example an upper inductive measuring coil 10 and a lower inductive measuring coil 12, which are arranged in pairs with respect to each other. A provided conveying direction 14 of a string 28 shown by the dashed line in FIG. 1, formed from an electrical conductor with an insulating casing, progresses centered between the measuring coils 10, 12. A first optical measuring apparatus 16 is located in a first optical measuring plane in the conveying direction in front of the inductive measuring coils 10, 12. A second optical measuring apparatus 18 is located in a second optical measuring plane in the conveying direction behind the inductive measuring coils 10, 12. The optical measuring apparatuses 16, 18 comprise at least one optical radiation source and at least one two-dimensionally spatial resolution optical sensor, formed for example from two or more adjacently arranged sensor rows. As can be seen in FIG. 1, the inductive measuring apparatus and the optical measuring apparatuses are each spatially expanded as seen in the conveying direction 14 of the string 28. The respective measuring planes lie respectively centered with respect to the spatial expansion of the measuring apparatuses and perpendicular to the conveying direction 14. The conveying direction 14 simultaneously forms the symmetrical axis of the measuring apparatuses.

Moreover, the device according to the invention comprises an evaluation apparatus shown with the reference number 20, to which also belongs an apparatus 22 for determining the position of the edges of the string in the first optical measuring plane and an apparatus 24 for determining the position of the edges of the string in the second optical measuring plane.

In the generally known manner, the position of the conductor is measured by the measuring coils 10, 12 in the inductive measuring apparatus in the inductive measuring plane. For this, the respective measuring results of the measuring coils 10, 12 are transferred to the evaluation apparatus via an amplifier 26, which determines the position of the conductor in the inductive measuring plane from the measurement data. Moreover, the position of the string in the first optical measuring plane or respectively the second optical measuring plane is respectively measured by the first optical measuring apparatus 16 and by the second optical measuring apparatus 18. This can occur in the generally known manner through a diffraction seam analysis of the shadow borders of the string 28 formed on the optical sensors of the optical measuring apparatuses, as described for example in EP 0 924 493 B1. The evaluation apparatus 20 determines a position of the string in the inductive measuring plane from the positions of the string determined by the first and second optical measuring apparatus 16, 18 in the first or respectively second optical measuring plane. From this, the evaluation apparatus 20 in turn determines in the generally known manner the centricity of the conductor in the insulating casing.

A string with the reference number 28 is represented in the example shown in FIG. 1. In the representation exaggerated for illustrative purposes, the string 28 progresses along a straight line, but it progresses in a sloped manner with respect to the actually provided conveying direction 14. In the measurement example shown in FIG. 1, sloping positions of the string 28 are determined by the first and second optical measuring apparatuses, which are arranged along a straight line in the shown example. In this measurement state, the position of the string 28 in the inductive measuring plane can be determined for example through interpolation between the measured sloping positions. The measurement situation shown in FIG. 1 can also generally be handled with devices of the state of the art.

Figure 2:
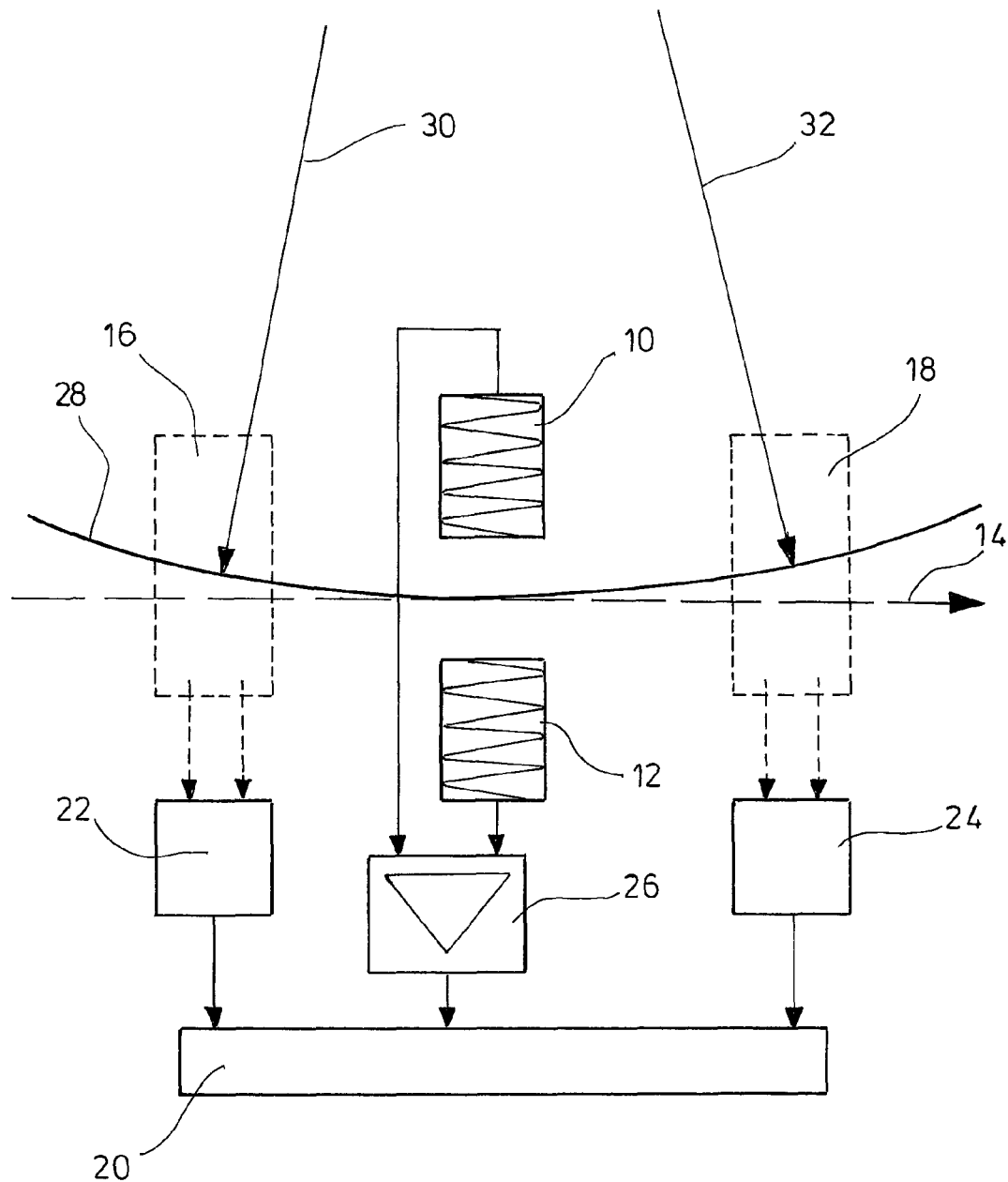
FIG. 2 the device from FIG. 1 in a second measurement situation.

In contrast, FIG. 2 shows a measurement situation that leads to an undefined measurement error in the case of conventional systems. It can be seen in FIG. 2 that the string 28 has a sagging also shown exaggerated for illustrative purposes and thus has a curvature. As explained above, this is almost unavoidable. In the example shown in FIG. 2, support elements (not shown) supporting the string 28 in a system-dependent manner are arranged at larger distances of a few meters, for example support rollers, mirror-symmetrically to the inductive measuring plane. It is hereby achieved that the maximum sagging of the string 28 lies in the area of the inductive measuring plane. As results directly from the representation in FIG. 2, the first and second optical measuring apparatuses in turn respectively measure a sloping position or respectively curvature with respect to the actually desired conveying direction 14. The question whether the optical measuring apparatuses can respectively differentiate between a sloping position and a curvature depends on the spatial resolution of the optical measuring apparatuses, as explained above. The sagging of the string 28 leads to measurement results of the optical measuring apparatuses, which are mirrored on the inductive measuring plane.

For the evaluation, a radial line or respectively perpendicular line can be respectively calculated for the curved or respectively sloping sections measured by the optical measuring apparatuses and a point of intersection of these perpendicular or respectively radial lines can be determined as the center point of a circle. The perpendicular or respectively radial lines are shown in FIG. 2 with the reference numbers 30, 32. The circle is selected starting from this center point so that the sloping or respectively curved sections measured by the optical measuring apparatuses form segments of the circle or respectively chords on the circle. A diameter or radius of the circle is then also determined by the evaluation apparatus 20. A position of the string corrected based on the sagging in the inductive measuring plane can be determined on this basis taking into consideration the maximum sag in the area of the inductive measuring plane. This corrected position of the string forms the basis for the centricity determination of the conductor in the insulating casing, which is also performed by the evaluation apparatus 20.

Figure 3:
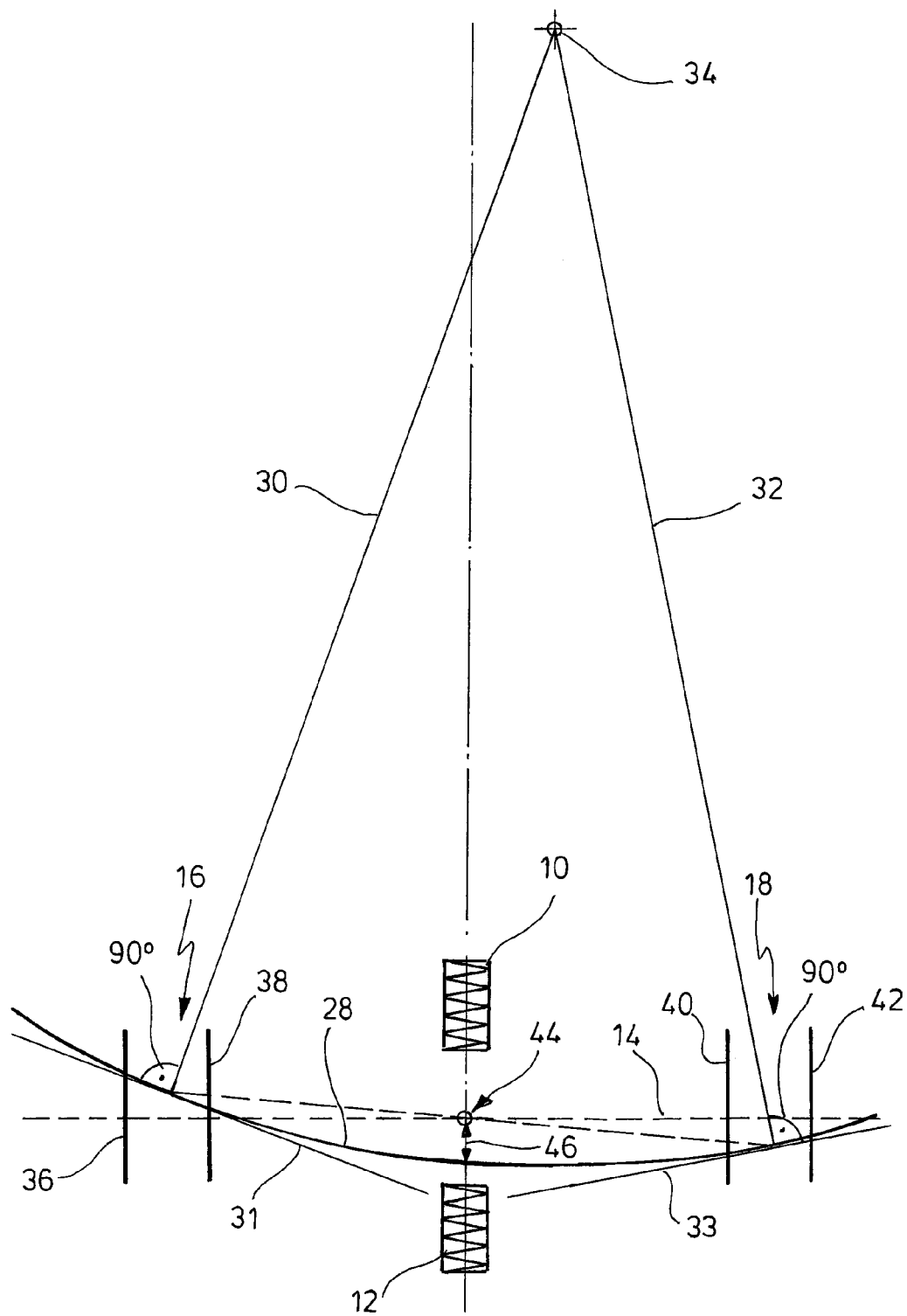
FIG. 3 the device from FIG. 1 in a third measurement situation.
Figure 4:
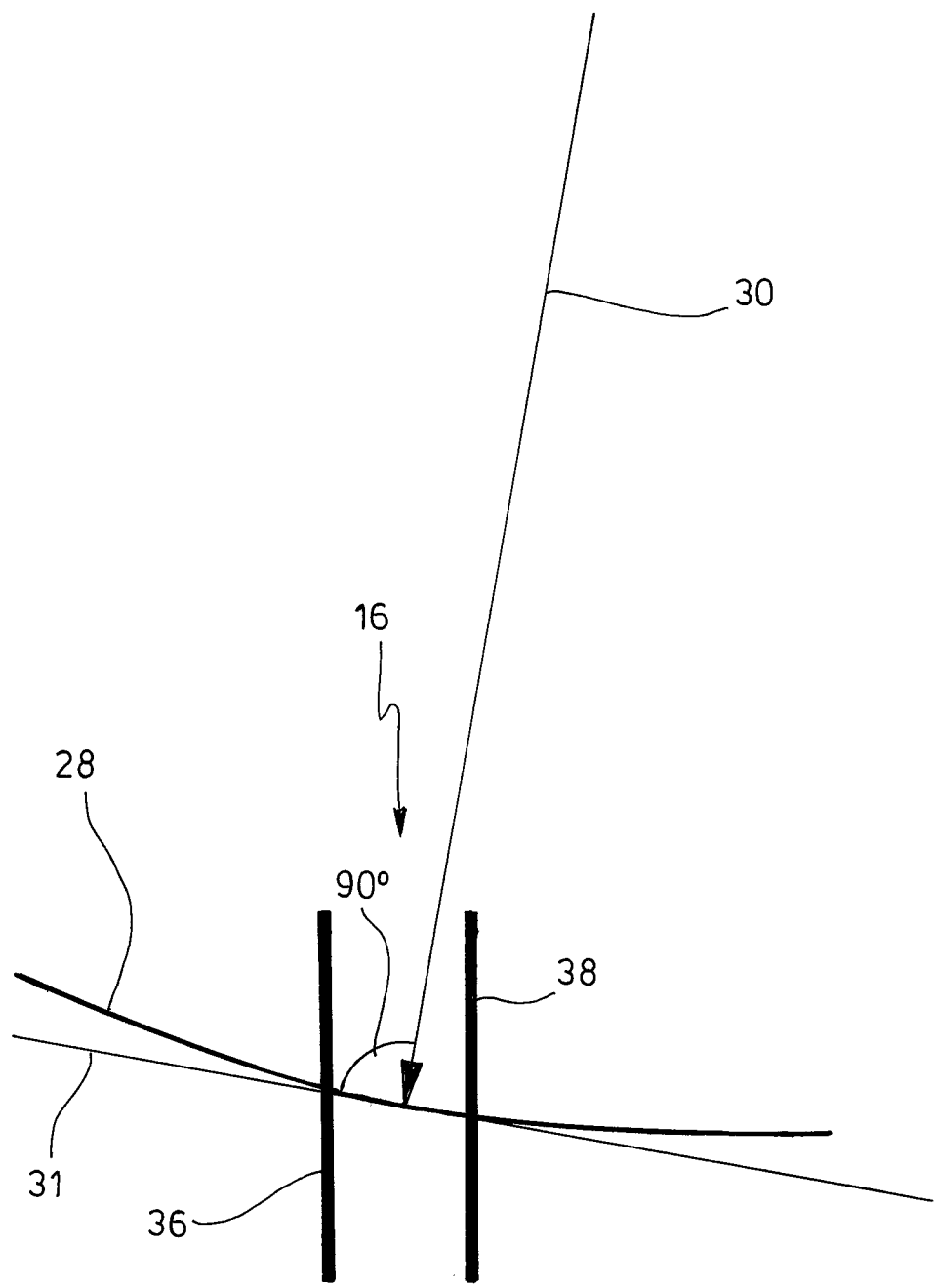
FIG. 4 an enlarged representation of a part of FIG. 3.

FIGS. 3 and 4 show a measurement situation, which mainly corresponds with the measurement situation shown in FIG. 2 and explained above. In contrast to the measurement situation in FIG. 2, the maximum curvature or respectively the maximum sagging of the string 28 in the example in FIGS. 3 and 4 does not lie in the area of the inductive measuring plane, but rather offset laterally with respect to it, in particular laterally next to the center axis of the inductive measuring head perpendicular to the conveying direction 14. The center point 34 of the circle formed by the perpendicular or respectively radial lines 30, 34 thus also lies offset laterally with respect to the inductive measuring plane. In FIG. 3, the perpendicular or respectively radial lines 30, 32 show the curvature radius of the string 28. The chords for the formed circle can be seen in FIGS. 3 and 4 with reference numbers 31 and 33. The perpendicular or respectively radial lines 30, 32 are located on these chords 31, 33 respectively at an angle of 90°. Two optical sensor rows 36, 38 and 40, 42 of the optical measuring apparatuses 16 and 18, which are aligned perpendicular to the conveying direction 14 of the string 28, are also shown in FIGS. 3 and 4. The chords 31, 33 were thereby formed respectively between the sensor rows 36 and 38 or respectively 40 and 42. Instead of the chords 31, 33, tangents can also be placed adjacent to the curvature of the string 28 in the point of intersection of the perpendicular or respectively radial lines 30, 32. The reference number 44 shows the geometric center between the optical measuring apparatuses 16, 18, which would correspond with the position of the string 28 between the optical measuring apparatuses 16, 18, if the string 28 were not curved. Based on the curvature, the actual position of the string 28 deviates however from the geometric center 44, as shown by reference number 46. This measurement error is compensated according to the invention.

Figure 5:
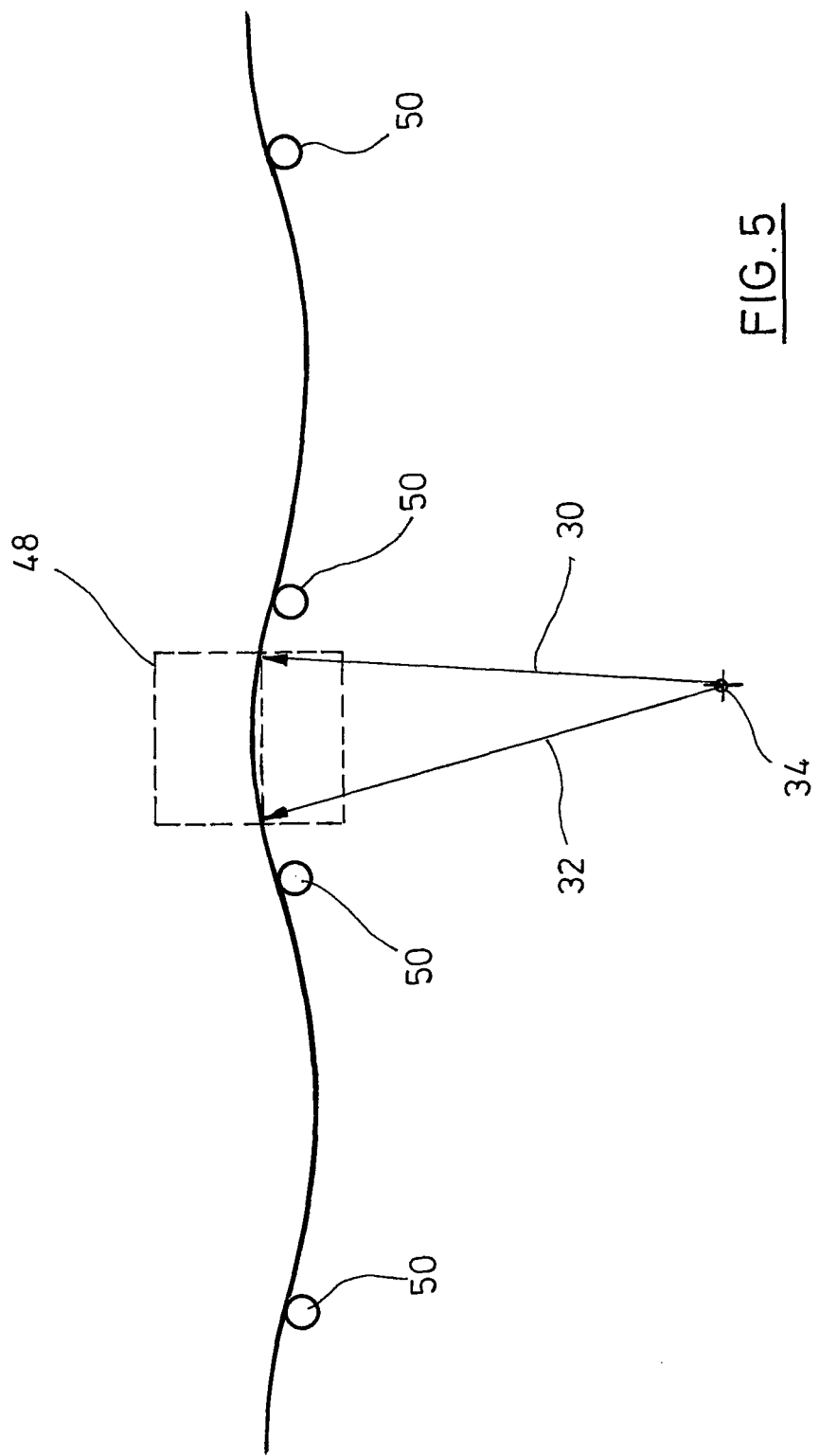
FIG. 5 another measurement situation.

FIG. 5 shows another measurement situation for illustrative purposes, in which the string 28 in the area of the measuring apparatuses (measurement area of the optical and inductive measuring apparatus shown schematically with reference number 48 in FIG. 5) has no sagging but rather an upwards bulge, caused by the arrangement of the support rollers 50 supporting the string 28. Thus, in addition to the (outer) support rollers 50 provided normally and for example in the embodiments in FIGS. 1 to 4, FIG. 5 shows additional (inner) support rollers 50, which are arranged relatively closely in front of and behind the measurement area 48 of the optical and inductive measuring apparatus. These additional support rollers 50 can lead to the upwards bulge of the string 28 that can be seen in FIG. 5. According to the invention, this measurement situation can also be managed safely and reliably.

Figure 6:
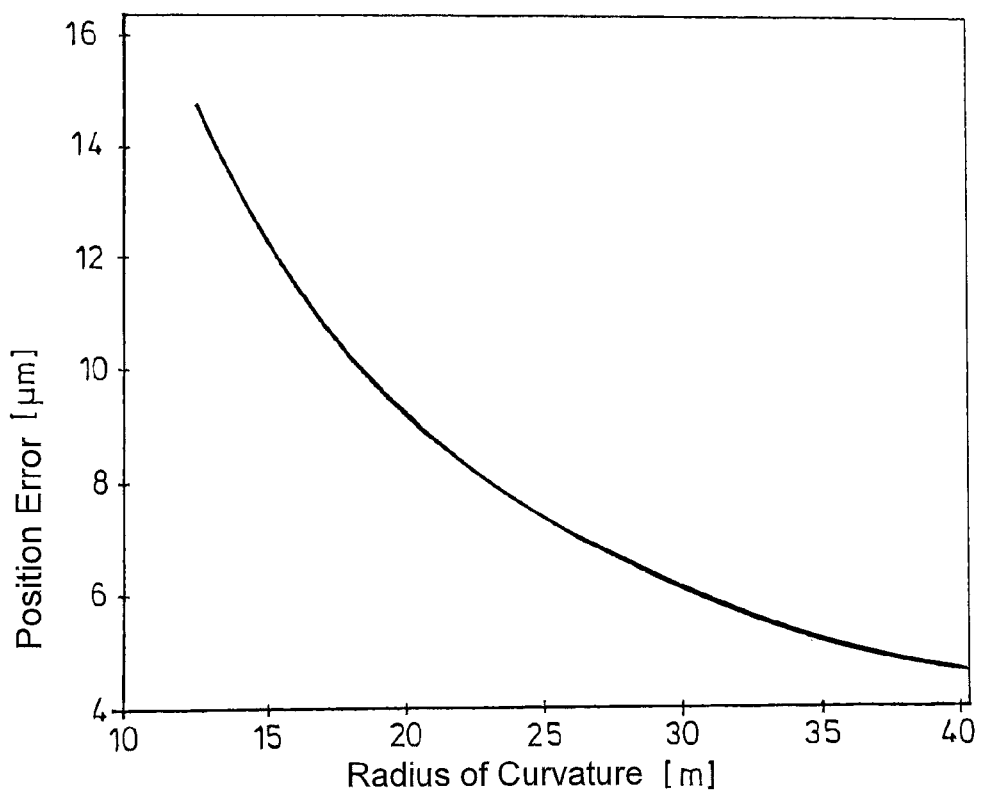
FIG. 6 a diagram for visualizing the measurement error in the case of a curvature of a measured string.

In addition to geometric errors, as shown in FIGS. 1 to 5, a curvature of the conductor causes additional measurement errors, caused by an aggregation of the magnetic field strengths measured by the inductive sensors in the direction of the curvature. The measurements of the inductive sensors are thereby afflicted with an additional measurement error generated by the conductor curvature. FIG. 6 shows a connection between the curvature radius of a sagging string and the resulting measurement error in the case of a conventional determination of the centricity of the conductor in the insulating casing. It can be seen that the measurement error applied to the ordinate in μm increases exponentially with a decrease in the curvature radius applied to the abscissa in meters. As initially explained, curvature radii of 10 m are quite realistic. The applied measurement error results based on an inductive determination of the position of the conductor according to the Biot-Savart law. This was based on an inductive sensor with a sensor surface of 16 mm (width)×6 mm (height) at a distance of 10 mm between the bottom edge of the sensor and the conveying direction 14 defining the measuring head axis. Such measurement errors can also be reliably avoided with the method according to the invention or respectively the device according to the invention and the hereby achieved identification of the conductor curvature.

The invention claimed is:

1. A method for measuring the centricity of a conductor in an insulating casing, in which the string (28) formed by the conductor with its insulating casing is moved along a conveying direction (14), comprising the steps:

in an inductive measuring plane, the position of the conductor is determined by means of an inductive measuring apparatus, in a first optical measuring plane, which lies in the conveying direction (14) of the string (28) in front of the inductive measuring plane, the position of the string (28) is determined by means of at least one first optical measuring apparatus (16), in a second optical measuring plane, which lies in the conveying direction (14) of the string (28) behind the inductive measuring plane, the position of the string (28) is determined by means of at least one second optical measuring apparatus (18), the positions of the string (28) determined in the first and second optical measuring plane are correlated such that a position of the string (28) results in the inductive measuring plane and the centricity of the conductor in the insulating casing is determined from this resulting position of the string (28) in the inductive measuring plane and from the position of the conductor determined in the inductive measuring plane, wherein a spatial resolution optical measurement takes place in the first optical measuring plane and/or in the second optical measuring plane such that a sloping position and/or a curvature of the string (28) with respect to the conveying direction (14), in particular in the first optical measuring plane and/or in the second optical measuring plane, is identified, wherein such a sloping position and/or curvature is taken into consideration during the determination of the centricity of the conductor in the insulating casing.

2. The method according to claim 1, characterized in that a spatial resolution optical measurement takes place in the first optical measuring plane and in the second optical measuring plane respectively, such that a sloping position and/or a curvature of the string with respect to the conveying direction, in particular in the first optical measuring plane and in the second measuring plane, is identified.

3. The method according to claim 1, wherein a corrected position of the string (28) in the inductive measuring plane is created based on a sloping position and/or curvature of the string (28) with respect to the conveying direction (14) identified in particular in the first optical measuring plane and/or in the second optical measuring plane, based on which the centricity of the conductor in the insulating casing is determined.

4. The method according to claim 1 wherein a curvature radius or curvature diameter of the string (28) is determined from the optical measurement performed in the first optical measuring plane and/or in the second optical measuring plane, based on which the corrected position of the string (28) in the inductive measuring plane is created.

5. The method according to claim 4, wherein the curvature radius or curvature diameter of the string (28) is determined in that a circle is formed, for which identified curvatures of the string (28) form circular segments in the first optical measuring plane and/or in the second optical measuring plane, wherein the radius or diameter of this circle is selected as the curvature radius or curvature diameter.

6. The method according to claim 5, wherein a point of intersection of two radial lines is selected as the center point of the circle for the identified curvatures of the string (28) in the first optical measuring plane and/or in the second optical measuring plane.

7. The method according to claim 4, wherein the curvature radius or curvature diameter is determined for a sloping position of the string (28) identified in the first optical measuring plane and/or in the second optical measuring plane, in that respectively one perpendicular line is created on the determined sloping positions of the string (28) and the point of intersection of the perpendicular lines is selected as the center point of a circle, for which the identified sloping positions of the string (28) form tangents or chords, wherein the radius or diameter of this circle is selected as the curvature radius or curvature diameter.

8. The method according to claim 1 wherein the inductive measuring plane and/or the first optical measuring plane and/or the second optical measuring plane lie perpendicular to the conveying direction (14) of the string (28).

9. The method according to claim 1 wherein the string (28) is supported along its conveying direction (14) by several support elements, preferably several support rollers, wherein the support elements immediately preceding and immediately following the inductive measuring plane are arranged mirror-symmetrical to the inductive measuring plane.

10. The method according to claim 1 wherein the at least one first optical measuring apparatus (16) and/or the at least one second optical measuring apparatus (18) comprise at least one optical radiation source and at least one two-dimensionally spatial resolution optical sensor.

11. The method according to claim 1 wherein the inductive measuring apparatus comprises at least two inductive measuring coils (10, 12), which are arranged in pairs with respect to each other in the inductive measuring plane.

12. A device for measuring the centricity of a conductor in an insulating casing, in which the string (28) formed by the conductor with its insulating casing is moved along a conveying direction (14), comprising:

an inductive measuring apparatus arranged in an inductive measuring plane for determining the position of the conductor in the inductive measuring plane, at least one first optical measuring apparatus (16) arranged in a first optical measuring plane, which lies in the conveying direction (14) of the string in front of the inductive measuring plane, for determining the position of the string (28) in the first optical measuring plane, at least one second optical measuring apparatus (18) arranged in a second optical measuring plane, which lies in the conveying direction (14) of the string (28) behind the inductive measuring plane, for determining the position of the string (28) in the second optical measuring plane, an evaluation apparatus (20), which is designed to correlate the positions of the string (28) determined in the first and second optical measuring plane such that a position of the string (28) results in the inductive measuring plane and to determine the centricity of the conductor in the insulating casing from this resulting position of the string (28) in the inductive measuring plane and from the position of the conductor determined in the inductive measuring plane, wherein the at least one first optical measuring apparatus (16) and/or the at least one second optical measuring apparatus (18) are designed to perform a spatial resolution optical measurement in the first optical measuring plane and/or in the second optical measuring plane such that a sloping position and/or a curvature of the string (28) with respect to the conveying direction (14), in particular in the first optical measuring plane and/or in the second optical measuring plane, is identified and wherein the evaluation apparatus (20) is further designed to take such a sloping position and/or curvature into consideration during the determination of the centricity of the conductor in the insulating casing.

13. The device according to claim 12, wherein the inductive measuring plane and/or the first optical measuring plane and/or the second optical measuring plane lie perpendicular to the conveying direction (14) of the string (28).

14. The device according to claim 12, wherein several support elements, preferably several support rollers, are also provided, which support the string (28) along its conveying direction (14), wherein the support elements immediately preceding and immediately following the inductive measuring plane are arranged mirror-symmetrical to the inductive measuring plane.

15. The device according to claim 12, wherein the at least one first optical measuring apparatus (16) and/or the at least one second measuring apparatus (18) comprise at least one optical radiation source and at least one two-dimensionally spatial resolution optical sensor.

16. The device according to claim 12, wherein the inductive measuring apparatus comprises at least two inductive measuring coils (10, 12), which are arranged in pairs with respect to each other in the inductive measuring plane.

* * * * *